April 19, 1966 G. T. LYON ETAL 3,246,921
REUSABLE COUPLING FOR FLEXIBLE HOSE
Filed June 17, 1963 2 Sheets-Sheet 1

INVENTORS
GILBERT T. LYON
DANIEL T. FRANKLIN
BY
Burton & Parker
ATTORNEYS

April 19, 1966  G. T. LYON ETAL  3,246,921
REUSABLE COUPLING FOR FLEXIBLE HOSE
Filed June 17, 1963  2 Sheets-Sheet 2

INVENTORS
GILBERT T. LYON
DANIEL T. FRANKLIN
BY
Burton & Parker
ATTORNEYS

United States Patent Office 3,246,921
Patented Apr. 19, 1966

3,246,921
REUSABLE COUPLING FOR FLEXIBLE HOSE
Gilbert T. Lyon, Royal Oak, Mich., and Daniel T. Franklin, Libertyville, Ill., assignors to L&L Manufacturing Company, Warren, Mich., a corporation of Michigan
Filed June 17, 1963, Ser. No. 288,262
4 Claims. (Cl. 285—247)

This invention relates to improvements in a hose coupling for flexible hose, and in particular to a reusable coupling peculiarly suitable for use with high pressure plastic hose such as nylon or the like.

An object is to provide an improved reusable hose coupling designed for quick and easy assembly with flexible plastic hose to achieve a leak-proof connection at elevated pressures.

Another object is to provide a reusable hose coupling for plastic hose whereby the hose is securely held within the coupling against loosening therefrom and wherein the gripping forces on the hose are such that the hose is not subjected to high stress or strain either during assembly or upon the application of high pressures within the hose connection.

The high pressure hose shown in the drawings comprises an extruded nylon core tube, an outer sheath of nylon tube, and a reinforcing layer of nylon braid disposed between the core tube and the sheath. Unlike the commonly used high pressure hose having rubber inner and outer layers with a metallic braid therebetween integrally associated with the rubber layers, the reinforcing braid of this nylon hose is not integrally connected to the core tube and/or the sheath. Some sort of bonding agent is utilized in some types of the hose to achieve a bond between the hose layers, but the core tube and sheath do not flow into the interstices of the reinforcing braid, as is the case with certain types of reinforced rubber hose. Therefore there exists the possibility of relative shiftable movement among the individual hose layers upon the application of tensile forces to the hose, which problem is not encountered with reinforced rubber hose.

Furthermore, the nylon used in the fabrication of high pressure hose, especially that used for the core tube, is appreciably stiffer and less flexible than some other hose materials such as rubber. Also nylon does have some tendency to cold flow under conditions of high temperature and/or pressure. While a controlled amount of cold flow is desirable and even necessary to achieve a satisfactory connection, care must be exercised in handling this type of hose to insure against overstressing the nylon because of this cold flow characteristic. Hence if the gripping force of the coupling on the hose is exerted primarily at a single point, the nylon will cold flow at that point of high stress, causing the hose to fail.

It is therefore a particular object to provide a hose coupling for plastic hose which coupling comprises an internally threaded shell and an externally threaded stem both exhibiting a slight taper in the same direction, whereby the shell may first be threaded onto the hose without stressing the hose, and the stem may thereafter be inserted into the hose bore to expand the hose slightly during insertion so as to grip the hose securely between the shell and stem, to achieve a substantially uniform gripping pressure on the hose throughout the entire effective length of the coupling, due to the cooperating taper and thread configurations on the shell and stem.

Other objects, advantages and meritorious features will more fully appear from the following specification, claims and accompanying drawings, wherein:

Figure 1:
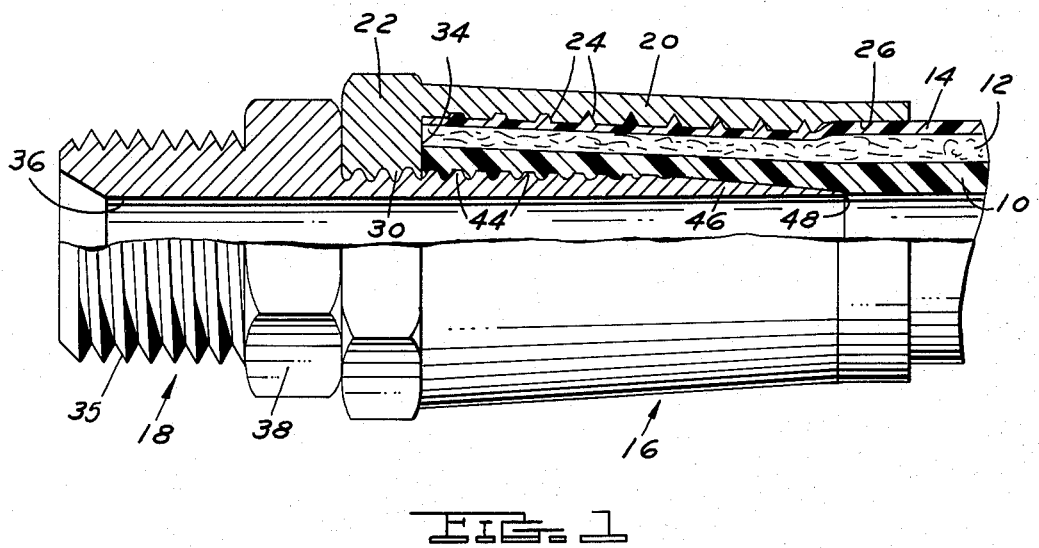
FIG. 1 is an enlarged elevation partly in section showing a hose coupling embodying the invention assembled on a length of flexible hose.
Figure 2:
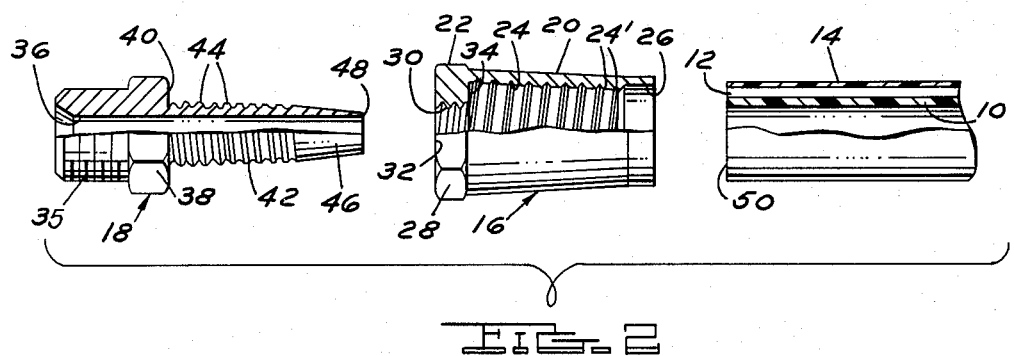
FIG. 2 is an exploded elevation partly in section showing the coupling parts and the hose of FIG. 1 ready for assembly.

Referring first to FIGS. 1 and 2, there is shown therein a length of high pressure hose comprising an extruded flexible nylon core tube 10, an intermediate reinforcing braid of non-metallic material 12, and an outer sheath of flexible nylon tube 14. This high pressure nylon hose is much tougher and at the same time considerably less flexible than similar hose made out of rubber or the like, and hence the assembly of a nylon hose in a fluid pressure coupling presents problems not encountered in the assembly of a rubber hose in an identical coupling.

The coupling shown in the drawings is designed to provide a fluid-tight connection without placing appreciable stress on the hose at any one point, while at the same time achieving a uniform grip on the hose through the length of the coupling. The coupling of FIGS. 1 and 2 in general comprises an outer shell or sleeve 16 and an inner stem 18. When in assembled condition on the hose as shown in FIG. 1, the shell 16 encircles the hose and the stem 18 is inserted into the hose bore.

The shell 16 is constructed of metal or the like and includes an inner end portion 20 and an outer end portion 22. The inner end portion 20 is first provided with an internally threaded length 24 and then it is swaged to provide a taper from the outer end 22 to at least a point adjacent the inner extremity of the shell. Preferably this tapered portion is disposed at an angle of between 1.5 and 3 degrees from the longitudinal center line of the shell. A taper of 2 degrees has been found to give excellent results.

The open end of shell portion 20 is provided with a counterbore 26 which is of a diameter just slightly greater than the outer diameter of the hose sheath 14 so that the hose may be slidably received without contraction in the counterbore of the shell. The thread crest diameter of the shell threads immediately adjacent the counterbore 26, which are indicated by the numeral 24', is less than the outer diameter of the hose, and thus the hose sheath 14 will be engaged and gripped by these first two or three threads as the hose end is rotatably inserted into the shell 16. However, due to the taper of the shell portion 20, the remaining threads are of increasing diameter, and do not normally contact the hose during insertion into the shell 16. This construction enables easy assembly of the hose within the shell and obviates excessive friction which causes heat to be generated during assembly.

The outer end 22 of shell 16 has a nut-like exterior 28 and is internally threaded as at 30. The end face 32 of such portion is preferably flat, as shown. Between the outer and inner end portions of the shell 16 there is provided an annular radial shoulder 34 against which the end of the hose abuts when the hose is inserted into the shell.

The stem 18 is externally threaded at its outer end as at 35 to be coupled with a cooperating fitting (not shown). The stem is a tubular member, and the diameter of the longitudinal flow passage 36 therethrough is substantially equal to the inner diameter of the hose core tube 10 to provide as nearly as possible unrestricted flow through the coupling. Adjacent the threaded length 35, the outer end of the stem is provided with a nut-like portion 38 terminating in a radial flat face 40 adapted to abut the face 32 of the shell 16 when the coupling is assembled. Theh inner end 42 of the stem 18 is provided with external threads 44 as shown cooperable with the internal threads 30 on the shell to enable threaded assembly of the two coupling parts. Once the threads 44 have been cut or rolled onto the stem 18, the thread crests are cut away or ground off to provide the threaded portion of the stem with a taper identical to the taper on the shell 16. Thus when the stem and shell are assembled, the threaded portion of the stem 18 will be parallel to the threaded portion of the shell 16, with the hose engaged and gripped therebetween.

In addition, the inner end of the stem 18 is provided with a smooth conically tapered extremity 46 disposed at a slightly greater angle to the longitudinal center line than the threaded length 44, say in the range of between four and eight degrees. A smooth taper of six degrees has been found to give very satisfactory results. The tapered length 46 terminates at the end of the stem 18 in a fairly sharp edge 48, as shown. As can be seen from FIG. 1, the length of the stem 18 engaged within the shell 16 is less than the corresponding length of the shell so that when the coupling is assembled the stem terminates generally radially opposite the inner end of counterbore 26 on the shell 16.

It has been found that best results are obtained when the threads 24 in the shell 16 are sharp V bottom standard threads having a 60 degree included angle. The threads 44 on the stem 18 on the other hand have a rounded crest and a rounded root contour. Of course the threaded length 30 in the shell are cooperably engageable with the stem threads 44. The depth of the threads 24, i.e., the distance from the crest to the root of each thread is less than the wall thickness of the hose sheath 14, so that the sheath is not cut through by the threads, which would weaken the hose and couse it to fail. The depth of the threads 44 on stem 16 is appreciably less than the wall thickness of the hose core tube 10, obviating any possibility of the stem threads cutting through the hose layer and causing a leak. In fact, the threads 44 on the stem are so proportioned that the core tube 10 is not actually cut by the threads in the manner that a tap cuts a thread in a metal pipe for example, which is actually a structural cutting of the pipe. Rather the threads deform the plastic which flows somewhat to completely fill the spaces between the threads, as a result of its tendency to return to its normal shape upon being deformed. The provision of rounded stem threads 44 therefore not only obviates any problems which would arise were the plastic to be actually structurally cut by the stem, but in addition insures that the plastic will flow into and completely fill the threads at the roots thereof, thus preventing a so-called "spiral leak" due to voids between the coupling threads and hose around which fluid under high pressures may seep.

To assemble the hose in the coupling, the hose end 50 is cut off square, and the core tube 10 beveled slightly for subsequent insertion of the stem. Then the hose is slidably inserted into the shell counterbore 26 until it engages the first of the threads 24', at which point the hose is rotated with respect to the shell 16, and the hose is threaded into the shell until the end 50 abuts the radial shoulder 34. Preferably the hose is then backed out of the shell about a quarter turn to allow for slight elongation during assembly of the stem 18. In this position only the portion of the hose engaged by the first two or three threads 24' is compressed at all, and even the stress in that area is relatively slight. The remaining portion of the hose end inserted in the shell 16 lies in relaxed condition due to the taper on the shell.

With the hose positioned in the shell 16, the inner end 48 of stem 18 is inserted in the outer end 22 of the shell until the first stem threads 44 are in position to begin engagement with the shell threads 30, at which point the smoothly tapered end portion 46 of the stem projects into the hose end, tending to expand the hose slightly. Preferably the stem is first lubricated with a suitable lubricant to facilitate assembly. The stem and shell are then progressively threaded together, expanding the hose slightly further, urging the hose sheath 14 into engagement with the threads 24 and grippingly engaging the core tube 10 of the hose on the threads 44. The hose is at the same time being compressed between the stem and shell. The engagement of stem and shell is continued until the faces 40 and 32 on the stem and shell respectively come into engagement.

Because of the tapers on both the shell and stem, the space therebetween decreases as the stem is progressively threaded into the shell. Thus the maximum gripping force on the hose is not reached until the coupling is completely assembled. In addition to facilitating assembly of the coupling on the hose, this construction insures that no undue stresses are set up on the hose during assembly.

With the coupling fully assembled on the hose as shown in FIG. 1, the hose is firmly held to form a tight joint and effect a connection offering a high degree of resistance to leakage or loosening. The gripping action of the coupling on the hose occurs in the area of the threaded length 44 on the stem 18, while the sealing is accomplished primarily in the area of the smooth tapered stem portion 46. The distance between the end 48 of stem 18 and the interior wall of counterbore 26 on shell 16 is only slightly less than the wall thickness of the hose, so that the hose is only slightly compressed at that point. However, as the angle of taper on the stem portion 46 is greater than the taper of the shell, say six degrees versus two degrees, the distance between the stem and shell decreases toward the outer end of the coupling, reaching a minimum value at the juncture of the tapered stem portion 46 and the threaded portion 44, exerting an increasing compressive force on the hose farther away from the end 48 of the stem to attain an effective seal on the hose even at high pressure.

As the angle of taper on the threaded portion 44 of the stem 18 is equal to the taper of the shell 16, the distance between the crests of the threads 24 and 44 is uniform throughout the gripping portion of the coupling. Because the stem taper is achieved by removing the crests of the stem threads 44, the actual overall volume between the stem and shell is progressively slightly less nearer the smooth stem portion 46, and hence there is exerted a progressively greater compressive force on the hose wall leading away from the end 50 thereof, the force being greatest adjacent the smooth taper 46.

The length of the hose engaged between the coupling ports, or in other words the distance between the radial shoulder 34 and the inner stem end 48 when the coupling is assembled, is preferably at least three times the inner diameter of the core tube 10 of the hose. As the hose is gripped throughout this length to provide a fluid-tight seal and to prevent the hose from blowing out of the coupling, and as the compressive gripping force is fairly uniform, within certain limits, the stress upon the hose is distributed throughout an appreciable hose area, rather than being concentrated at one point or a few points. This results in the elimination of any possibility of overstressing the hose, which is a common cause of hose failure. In addition, the utilization of the construction shown limits the amount the hose must be expanded to accommodate the coupling, and thus the reinforcement braid 12 of the hose is not stressed to any appreciable degree, and failure due to weakening of the braid is practically eliminated. Further, the depth and configuration of the threads on the stem is such that the core tube 10 is not actually structurally cut by the threads, but is merely displaced, whereby the plastic flows into the thread roots, completely filling the threads and thereby preventing spiral leaks.

Figure 3:
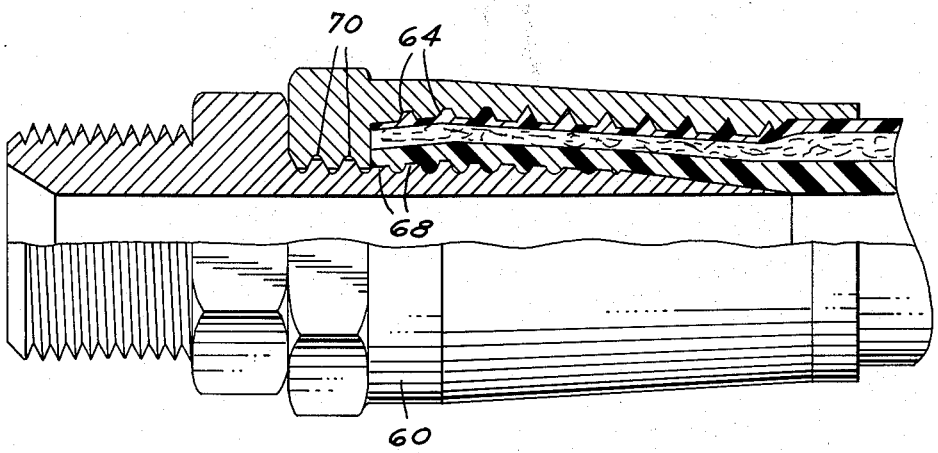
FIG. 3 is an enlarged elevation similar to FIG. 1 showing a slightly modified form of hose coupling.
Figure 4:
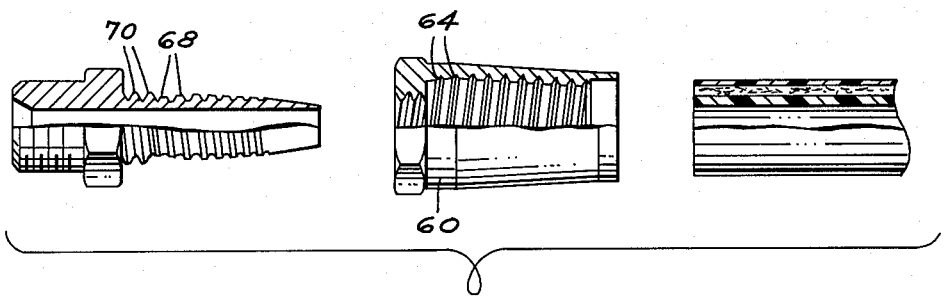
FIG. 4 is an exploded elevation partly in section showing the coupling parts and the hose of FIG. 3 ready for assembly.

Turning now to FIGS. 3 and 4, there is shown a coupling in general identical to the coupling shown in FIGS. 1 and 2, and therefore the same reference numerals have been used to indicate similar parts. The coupling shell 16 and stem 18 are of the same size and shape as hereinabove described, with one modification which will now be set forth.

The shell 16 is internally threaded as at 24, and is then swaged to provide the tapered inner end 20 as in FIGS. 1 and 2. However, in that portion of the shell adjacent the nut-like outer end 22, there is provided a reverse-tapered or back-tapered portion 60 which extends only a short distance along the shell, say the length of two or three threads as shown at 64. The remaining threaded length 24 is tapered at the same angle, say two degrees, as the shell of FIGS. 1 and 2.

The construction of the stem 18 is slightly altered in order to achieve the desired parallelism with the shell when the coupling parts are assembled, as shown in FIG. 3. Stem 18 has a smooth conical portion 46 as before, and is externally threaded as at 44 in the same manner as previously described. The crests of the threads adjacent the smooth surface 46 are then cut away as at 66 to provide a taper having an angle equal to the shell taper, say about two degrees.

This taper does not extend the complete length of the threaded portion 44 however, but is interrupted by a reverse-tapered or back-tapered portion adapted to be positioned radially opposite the back-tapered portion 60 of the shell when the coupling is assembled. Such back-tapered portion of the stem 18 is indicated by the threads 68 in FIGS. 3 and 4. In addition, the threads immediately adjacent the radial shoulder 40, shown at 70 in FIG. 4, which are threadedly engaged with the shell threads 30 when the coupling is fully assembled, are left full in order to provide a secure, strong engagement between the assembled stem 18 and shell 16.

The provision of the back-tapered portion on the shell 16 and stem 18 as above described, serve to assist in preventing the hose from pulling or blowing out of the coupling due to tension exerted on the hose or the application of high pressures to the hose. As can be seen from FIG. 3, in order for the hose end show at 70 gripped within this back-tapered portion to shift out of the coupling, the hose end 70 would have to expand radially over the "hump" on the stem resulting from the two oppositely tapered portions thereon. Such a construction renders it practically impossible for the hose to shift longitudinally with respect to the coupling.

There is thus shown herein a coupling for flexible plastic hose which is easily assembled and which provides a secure fluid-tight fitting for the hose. Assembly of the coupling on the hose is markedly easier than with previous couplings, and the hose is not subjected to high stresses which could weaken the hose and cause leaks. In addition, the coupling may be repeatedly assembled and disassembled without the use of special tools, and in the event of hose failure a new length of hose may be inserted in the existing coupling quickly and easily.

What is claimed is.

1. A coupling for use with flexible hose having a relatively hard plastic core tube and a plastic outer sheath reinforced by an intermediate braid of non-metallic material, comprising, in combination: a tubular coupling body having an outer end, an intermediate portion and an inner end, said outer end having an internal straight threaded length, said intermediate portion being axially inwardly tapered and provided with internal threads having a crest diameter adjacent the outer end greater than the hose outside diameter and tapering to a crest diameter at the inner end less than the hose outside diameter, with those threads whose crests are of lesser diameter than the hose outside diameter having V-shaped roots and with the crests thereof being flat, and said inner end portion of the body defining a smooth cylindrical counterbore adapted for sliding reception over a hose end; and a tubular stem having an outer end, an intermediate portion and an inner end, and an internal flow pasage substantially equal in diameter to the inner diameter of the hose core tube, said stem outer end being externally threaded for mating engagement with said straight threads on the outer end of said coupling body, said intermediate portion provided with external threads having rounded roots with the threads being of a successively decreasing height from said outer end toward said inner end and defining a thread crest taper substantially identical to the crest taper of the internal threads on the intermediate portion of said coupling body, with the threads on said stem intermediate portion having a thread crest diameter greater than the inner diameter of the hose core tube, and said inner end of the stem having a smooth exterior surface and being axially inwardly tapered at an angle with respect to the stem axis greater than the stem intermediate portion, and terminating, when the coupling is fully assembled on the hose, spaced axially outwardly of said coupling body inner extremity, intermediate the length of said smooth cylindrical inner end of the body.

2. The invention as defined in claim 1 characterized in that said intermediate coupling body portion terminates adjacent the outer end of the body in radially extending positive stop shoulder or abutment of the hose end thereagainst upon determined threaded assembly of the coupling body on the hose.

3. The invention as defined in claim 1 characterized in that said intermediate portion of said coupling body and said intermediate portion of said tubular stem are substantially identically tapered, each such taper defining an angle with respect to the longitudinal axis of the coupling of between 1.5 and 3 degrees.

4. The invention as defined in claim 3 further characterized in that said inwardly tapered inner end of the stem defines an angle with respect to the longitudinal axis of the coupling of between 4 and 8 degrees.

References Cited by the Examiner

UNITED STATES PATENTS

| | | | |
|---|---|---|---|
| 1,175,834 | 3/1916 | Stephens | 285—247 |
| 1,726,238 | 8/1929 | Pipher | 285—247 |
| 2,371,971 | 3/1945 | Main | 285—247 |
| 2,441,718 | 5/1948 | Parker | 285—247 |
| 2,540,113 | 2/1951 | Hartley | 285—259 |
| 2,816,781 | 12/1957 | Woodling | 285—251 |
| 2,965,395 | 12/1960 | Schmohl et al. | 285—251 |
| 2,974,980 | 3/1961 | Boyle | 285—247 |
| 3,177,016 | 4/1965 | Holmgren | 285—247 |

FOREIGN PATENTS 1,108,195   10/1955   France.

CARL W. TOMLIN, *Primary Examiner.*

THOMAS F. CALLAGHAN, *Examiner.*